US008576510B2

(12) United States Patent
Cherubini et al.

(10) Patent No.: US 8,576,510 B2
(45) Date of Patent: Nov. 5, 2013

(54) ROBUST METRIC COMPUTATION OF LONGITUDINAL POSITION (LPOS) DATA SYMBOL DETECTION

(75) Inventors: Giovanni Cherubini, Rueschlikon (CH); Jens Jelitto, Rueschlikon (CH); Robert A. Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/267,837

(22) Filed: Oct. 6, 2011

(65) Prior Publication Data

US 2013/0088794 A1 Apr. 11, 2013

(51) Int. Cl.
*G11B 5/584* (2006.01)

(52) U.S. Cl.
USPC ........................................ 360/77.12

(58) Field of Classification Search
None
See application file for complete search history.

(56) References Cited

U.S. PATENT DOCUMENTS

| 7,245,450 | B1 | 7/2007 | Cherubini et al. |
| 7,365,929 | B2 | 4/2008 | Cherubini et al. |
| 7,430,085 | B2 | 9/2008 | Tsunoda et al. |
| 7,460,323 | B2 | 12/2008 | Lee |
| 7,480,114 | B2 | 1/2009 | Cherubini et al. |
| 7,672,071 | B2 | 3/2010 | Lau |
| 7,742,254 | B2 | 6/2010 | Cherubini et al. |
| 7,787,204 | B2 | 8/2010 | Cherubini et al. |
| 7,903,360 | B2 | 3/2011 | Cherubini et al. |
| 2009/0174964 | A1 | 7/2009 | Cherubini et al. |
| 2010/0226037 | A1 | 9/2010 | Bui et al. |
| 2011/0013312 | A1 | 1/2011 | Bui et al. |
| 2011/0228421 | A1 | 9/2011 | Watanabe |

FOREIGN PATENT DOCUMENTS

WO 2009/136374 A2 11/2009

OTHER PUBLICATIONS

U.S. Appl. No. 12/838,336, filed Jul. 16, 2010.
Combined Search and Examination Report from European Application No. GB1212290.9 dated Nov. 12, 2012.

*Primary Examiner* — Paul Huber
(74) *Attorney, Agent, or Firm* — Zilka-Kotab, PC

(57) ABSTRACT

In one embodiment, a tape drive system includes a magnetic head having a servo sensor for sensing a defined servo track of a magnetic tape and configured to read servo pulses from servo bursts of the servo track while the magnetic tape is moving past the magnetic head with the servo bursts representing an encoded data symbol, an analog-to-digital converter configured to provide a sequence of samples of the readback servo signal, a digital correlator configured to compute a correlation signal between the sequence and a reference waveform, a timing reference module configured to provide a reference timing model having interpolation instants to the digital correlator, a correlation interpolator configured to interpolate the correlation signal at the interpolation instants and compute a longitudinal position (LPOS) detection metric, and an LPOS detector configured to decode the encoded data symbol of the servo bursts using the computed LPOS detection metric.

20 Claims, 13 Drawing Sheets

ROBUST METRIC COMPUTATION OF LONGITUDINAL POSITION (LPOS) DATA SYMBOL DETECTION

BACKGROUND

The present invention relates to reading information from a servo track in a longitudinal tape system, and more particularly, to using a robust metric computation for longitudinal position (LPOS) symbol detection.

Timing-based servo (TBS) systems utilize technology that was developed specifically for linear tape drives. In TBS systems, recorded servo patterns have transitions with two different azimuthal slopes. The head lateral position is derived from the relative timing of pulses generated by a servo reader reading the pattern. The servo patterns are written on five dedicated servo bands that straddle four data bands. A specification for the servo patterns in current tape drives is provided by the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 5 (LTO-2 to LTO-5) is available on the Internet.

TBS patterns allow the encoding of additional LPOS information without affecting the generation of the transversal position error signal (PES) which is used for lateral tape positioning. The LPOS information is obtained by binary pulse-position modulation (PPM) of dibits corresponding to the second and fourth stripes in bursts comprising five stripes. An LPOS word in the LTO format has 36 binary data symbols, or bits, and provides information on a specific absolute longitudinal address. Therefore, an LPOS word appears every 7.2 mm of the tape, i.e., once every 36 servo frames, each of which is 200 µm long and encodes 1 bit of information. The LPOS values of two consecutive LPOS words differ by one. Accordingly, an LTO drive can position the data/servo head assembly down a tape to a given LPOS value with a longitudinal resolution of 7.2 mm by using the LPOS information. The timing-based servo format has not changed over five generations of LTO drives (LTO-1 to LTO-5).

Optimum detection of the servo patterns is achieved by a synchronous servo channel employing an interpolator/correlator, which ensures that optimum filtering of the servo reader signal for extraction of timing information is performed not only at constant tape velocity, but also during acceleration and deceleration. A synchronous servo channel thus ensures the optimum processing of a servo signal for the generation of head lateral position estimates, velocity estimates, and LPOS information. However, the metric for LPOS detection is typically obtained by filtering interpolated samples of the servo signal waveform by a finite-impulse digital filter whose coefficients are obtained by down-sampling an impulse response. Ideally, this is equivalent to computing the metric for LPOS detection as the output of a matched filter at two predefined time instants. This method, however, is optimal only if the down-sampled matched filter response exactly matches the corresponding samples of the servo channel response. If there is a mismatch between the two responses, as for example when tape cartridges exhibit significant deviation of the servo format parameters from the standard values, LPOS detection performance may be severely impaired and tape drive operation compromised.

Furthermore, currently implemented methods do not provide a high margin against noise and other disturbances at high tape velocity, as aliasing effects adversely affect the computation of the metric for LPOS detection based on matched filtering by a finite-impulse response digital filter using fixed filter coefficients from a down-sampled impulse response.

BRIEF SUMMARY

In one embodiment, a tape drive system includes a magnetic head having at least one servo sensor for sensing at least one defined servo track of a magnetic tape, wherein the servo sensor is configured to read a plurality of servo pulses from one or more servo bursts of the servo track while the magnetic tape is moving past the magnetic head and the one or more servo bursts represent at least an encoded data symbol, an analog-to-digital converter configured to provide a sequence of samples of the readback servo signal, a digital correlator configured to compute a correlation signal between the sequence and a reference waveform, a timing reference module configured to provide a reference timing model having one or more interpolation instants to the digital correlator, wherein the correlation signal determined at each interpolation instant yields a detection metric for one data symbol, a correlation interpolator configured to interpolate the correlation signal at the interpolation instants and compute a longitudinal position (LPOS) detection metric according to the interpolated correlation signal samples, and an LPOS detector configured to decode the encoded data symbol of the one or more servo bursts using the computed LPOS detection metric and estimate a reliability of the decoded data symbol of the one or more servo bursts.

According to another embodiment, a computer program product includes a computer readable storage medium having computer readable program code embodied therewith. The computer readable program code includes computer readable program code configured to: receive a plurality of servo pulses read from at least one defined servo track of a magnetic tape while the magnetic tape is moving past a magnetic head, wherein the plurality of servo pulses are from one or more servo bursts, and the one or more servo bursts represent at least an encoded data symbol, provide a sequence of samples of the readback servo signal, compute a correlation signal between the sequence and a reference waveform, provide a reference timing model having one or more interpolation instants, wherein the correlation signal determined at each interpolation instant yields a detection metric for one data symbol, interpolate the correlation signal at the interpolation instants and compute a LPOS detection metric according to the interpolated correlation signal samples, and decode the encoded data symbol of the one or more servo bursts using the computed LPOS detection metric and estimate a reliability of the decoded data symbol of the one or more servo bursts.

In another embodiment, a method includes reading a plurality of servo pulses from one or more servo bursts of a servo track while a magnetic tape is moving past a magnetic head, wherein the one or more servo bursts represent at least an encoded data symbol, providing a sequence of samples of the readback servo signal, computing a correlation signal between the sequence and a reference waveform, providing a reference timing model having one or more interpolation instants, wherein the correlation signal determined at each interpolation instant yields a detection metric for one data symbol, interpolating the correlation signal at the interpolation instants and computing a LPOS detection metric according to the interpolated correlation signal samples, decoding the encoded data symbol of the one or more servo bursts using the computed LPOS detection metric, and estimating a reliability of the decoded data symbol of the one or more servo bursts, wherein the interpolated servo signal has about a constant data sample rate per unit length of the magnetic tape, the encoded data symbol represented by the one or more servo bursts corresponds to either a binary "zero" data symbol or a binary "one" data symbol, and from six to eighteen coefficients of the reference waveform are used to compute the correlation signal between the sequence and the reference waveform.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrates by way of example the principles of the invention.

DETAILED DESCRIPTION

Figure 1:
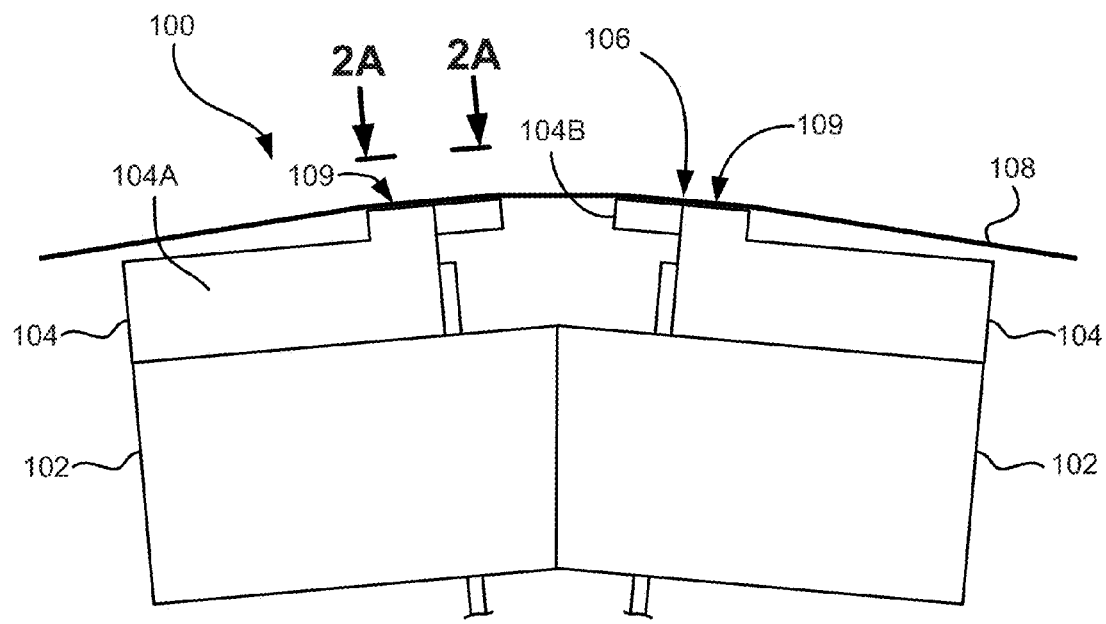
FIG. 1 illustrates a flat-lapped magnetic tape head, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

The following description describes gathering information from a servo track when operating a tape drive, and more particularly to using a robust metric computation for longitudinal position (LPOS) symbol detection from a servo track.

In one general embodiment, a tape drive system includes a magnetic head having at least one servo sensor for sensing at least one defined servo track of a magnetic tape, wherein the servo sensor is configured to read a plurality of servo pulses from one or more servo bursts of the servo track while the magnetic tape is moving past the magnetic head and the one or more servo bursts represent at least an encoded data symbol, an analog-to-digital converter configured to provide a sequence of samples of the readback servo signal, a digital correlator configured to compute a correlation signal between the sequence and a reference waveform, a timing reference module configured to provide a reference timing model having one or more interpolation instants to the digital correlator, wherein the correlation signal determined at each interpolation instant yields a detection metric for one data symbol, a correlation interpolator configured to interpolate the correlation signal at the interpolation instants and compute a longitudinal position (LPOS) detection metric according to the interpolated correlation signal samples, and an LPOS detector configured to decode the encoded data symbol of the one or more servo bursts using the computed LPOS detection metric and estimate a reliability of the decoded data symbol of the one or more servo bursts.

According to another general embodiment, a computer program product includes a computer readable storage medium having computer readable program code embodied therewith. The computer readable program code includes computer readable program code configured to: receive a plurality of servo pulses read from at least one defined servo track of a magnetic tape while the magnetic tape is moving past a magnetic head, wherein the plurality of servo pulses are from one or more servo bursts, and the one or more servo bursts represent at least an encoded data symbol, provide a sequence of samples of the readback servo signal, compute a correlation signal between the sequence and a reference waveform, provide a reference timing model having one or more interpolation instants, wherein the correlation signal determined at each interpolation instant yields a detection metric for one data symbol, interpolate the correlation signal at the interpolation instants and compute a LPOS detection metric according to the interpolated correlation signal samples, and decode the encoded data symbol of the one or more servo bursts using the computed LPOS detection metric and estimate a reliability of the decoded data symbol of the one or more servo bursts.

In another general embodiment, a method includes reading a plurality of servo pulses from one or more servo bursts of a servo track while a magnetic tape is moving past a magnetic head, wherein the one or more servo bursts represent at least an encoded data symbol, providing a sequence of samples of the readback servo signal, computing a correlation signal between the sequence and a reference waveform, providing a reference timing model having one or more interpolation instants, wherein the correlation signal determined at each interpolation instant yields a detection metric for one data symbol, interpolating the correlation signal at the interpolation instants and computing a LPOS detection metric according to the interpolated correlation signal samples, decoding the encoded data symbol of the one or more servo bursts using the computed LPOS detection metric, and estimating a reliability of the decoded data symbol of the one or more servo bursts, wherein the interpolated servo signal has about a constant data sample rate per unit length of the magnetic tape, the encoded data symbol represented by the one or more servo bursts corresponds to either a binary "zero" data symbol or a binary "one" data symbol, and from six to eighteen coefficients of the reference waveform are used to compute the correlation signal between the sequence and the reference waveform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," a "module," or a "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a flat-lapped bi-directional, two-module magnetic tape head 100, in accordance with one embodiment. As shown, the head includes a pair of bases 102, each equipped with a module 104. The bases may be "U-beams"

that are adhesively coupled together. Each module 104 includes a substrate 104A and a closure 104B with readers and writers 106 situated therebetween. In use, a tape 108 is moving over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

The substrates 104A are typically constructed of a wear resistant material, such as a ceramic. The closures 104B may be made of the same or similar ceramic as the substrates 104A.

The readers and writers 106 may be arranged in a piggyback configuration. The readers and writers 106 may also be arranged in an interleaved configuration. Alternatively, each array of channels may be readers or writers only. Any of these arrays may contain one or more servo readers.

Figure 2B:
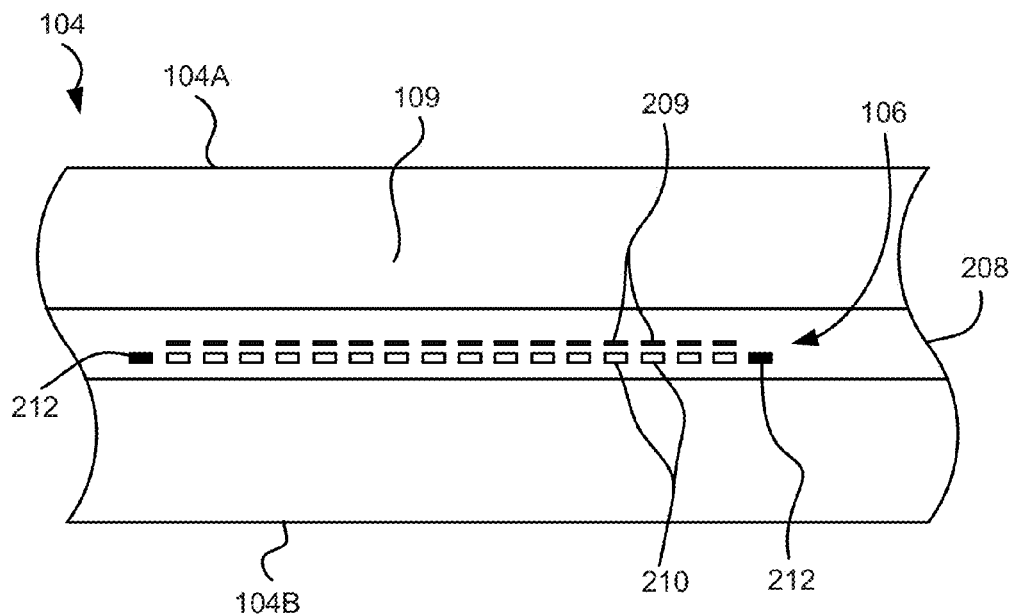
FIG. 2B is a detailed view taken from Circle 2B of FIG. 2A.
Figure 2A:
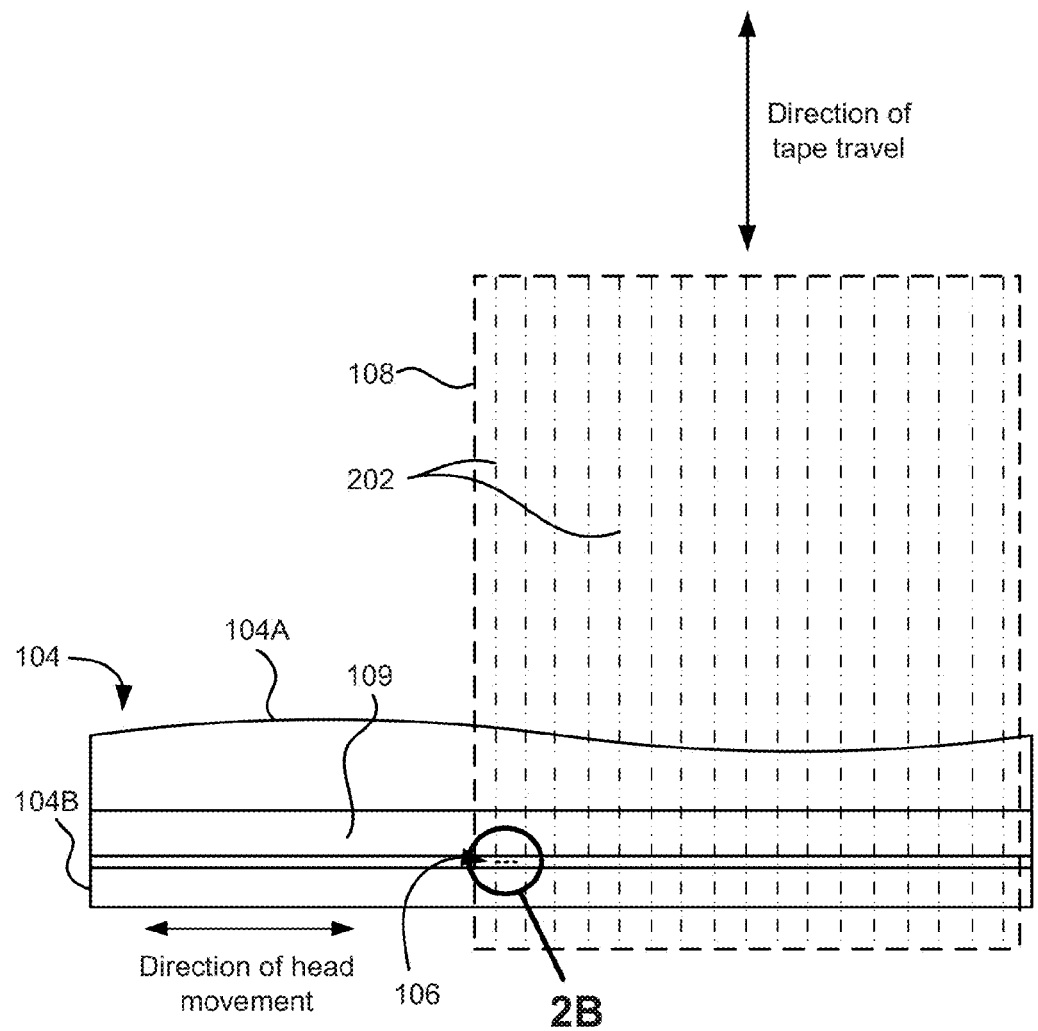
FIG. 2A is a tape bearing surface view taken from Line 2A of FIG. 1.

FIG. 2A illustrates the tape bearing surface 109 of one of the modules 104. A representative tape 108 is shown in dashed lines. The module 104 is preferably long enough to be able to support the tape as the head steps between data bands. In this example, the tape 108 includes 4-22 data bands, e.g., with 16 data bands and 17 servo tracks 202, as shown in FIG. 2A on a one-half inch wide tape 108. The data bands are defined between servo tracks 202. Each data band may include a number of data tracks, for example 96 data tracks (not shown). During read/write operations, the elements 106 are positioned within one of the data bands. Outer readers, sometimes called servo readers, read the servo tracks 202. The servo signals are in turn used to keep the elements 106 aligned with a particular track during the read/write operations.

FIG. 2B depicts a plurality of read and/or write elements 106 formed in a gap 208 on the module 104 of FIG. 2A. As shown, the array of elements 106 includes, for example, 16 writers 209, 16 readers 210 and two servo readers 212, though the number of elements may vary. Illustrative embodiments include 8, 16, 32, and 64 elements per array 106. A preferred embodiment includes 16 readers per array and/or 16 writers per array. While the readers and writers may be arranged in a piggyback configuration as shown in FIG. 2B, the readers 210 and writers 209 may also be arranged in an interleaved configuration. Alternatively, each array of elements 106 may be readers or writers only, and the arrays may contain one or more servo readers. As noted by considering FIGS. 1 and 2A-B together, each module 104 may include a complementary set of elements 106 for such functions as bi-directional reading and writing, read-while-write capability, etc.

In some embodiments, the width of the servo reader is such that transition broadening effects are minimized. Giant Magnetoresistive (GMR) and Tunneling Magnetoresistive (TMIR) devices are preferably used in servo readers for advanced formats which require servo readers having small widths such as 0.5 micrometers. A typical servo track, shown in FIG. 3A, includes repeating servo patterns 302. A typical servo pattern 302 includes one or more magnetically-defined base sets, also known as "servo bursts" 304 (e.g., in a chevron shape: / \) of two or more magnetically-defined bars, also known as "servo marks" or "servo stripes" 306, which may be written concurrently, in some embodiments.

Figure 3A:
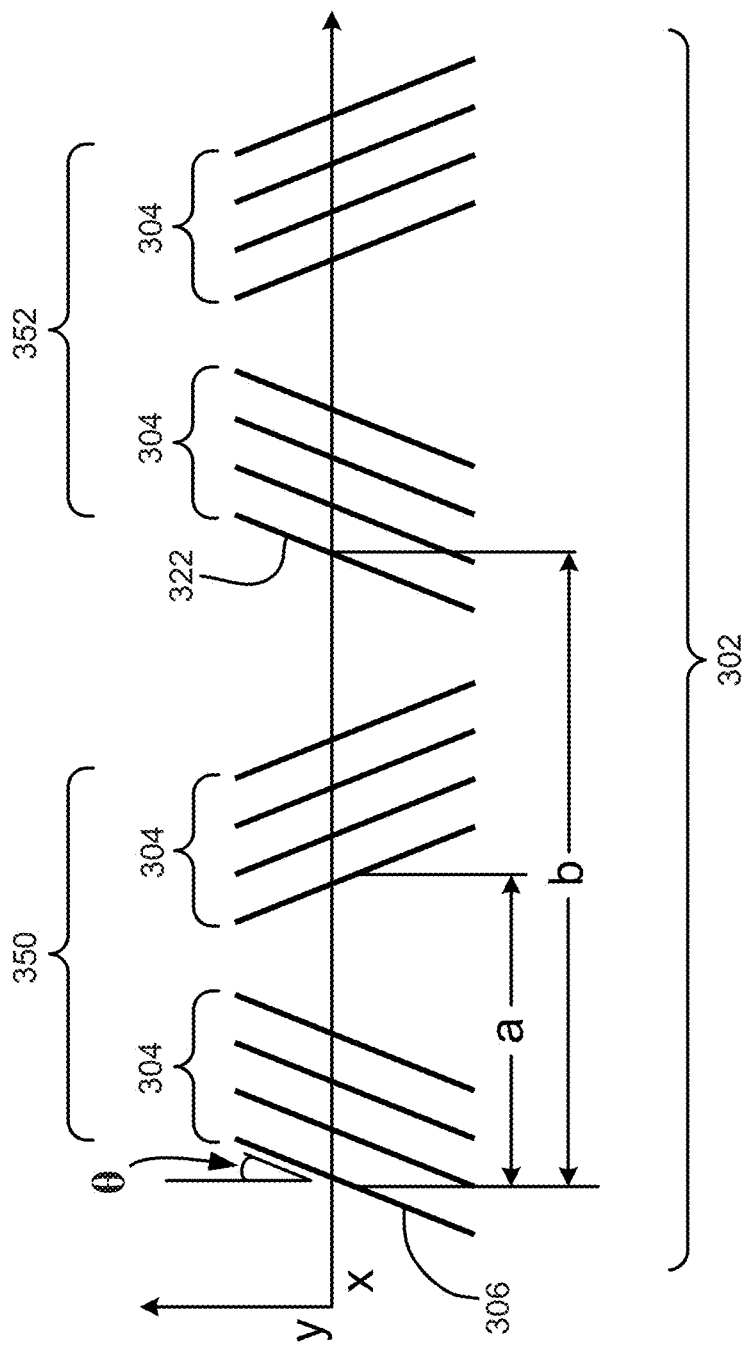
FIG. 3A is a representative diagram of a conventional servo pattern according to the prior art.

In further embodiments, servo patterns 302 may include groups 350, 352 of nested servo bursts 304 (e.g., /// \\\). In some approaches, the distance between the first servo mark 306 in a group 350 and the first bar 322 in the next group 352, b, is equal to about two times the distance between a base set, a, according to one embodiment. As depicted in FIG. 3A, a and b are the distances between oppositely angled and parallel transitions at a position y above or below the centerline, and θ is the azimuth angle of the servo mark 306 relative to an imaginary axis extending from and perpendicular to the servo band centerline x at the intersection of the servo band centerline x and the servo mark 306. In LTO, the azimuth angle θ is 60, but can vary in a range from about 0° to about 20°, according to various approaches.

Note that the chevron-type servo pattern is one of many that can be used in various embodiments of the present invention. Other illustrative servo patterns include "M" type (/ \, / \, |\ / |, / | \, etc.), "N" type (/ \ /, | \|, / | /, etc.), etc. The M or N type patterns may be preferable to simple two-bar chevron type servo patterns in some instances, such as where the N or M pattern contain parallel bars, thereby allowing the system to calculate more accurately a velocity of the tape.

Variations and combinations of the foregoing types of servo base sets are also possible in further embodiments. Also note that in such arrangements, and as would be understood by one having ordinary skill in the art upon reading the present descriptions, the bars need not all have identical direct or inverse angles.

In some embodiments, the angle θ may be decreased, thereby allowing a faster servo pattern repetition rate. In other embodiments, the angle θ may be increased, thereby allowing a more accurate estimation of the lateral position of a servo reader.

According to some embodiments, the servo track may have data embedded or encoded therein. This data may include data for encryption, for ascertaining a longitudinal position along the tape, etc.

Figure 3B:
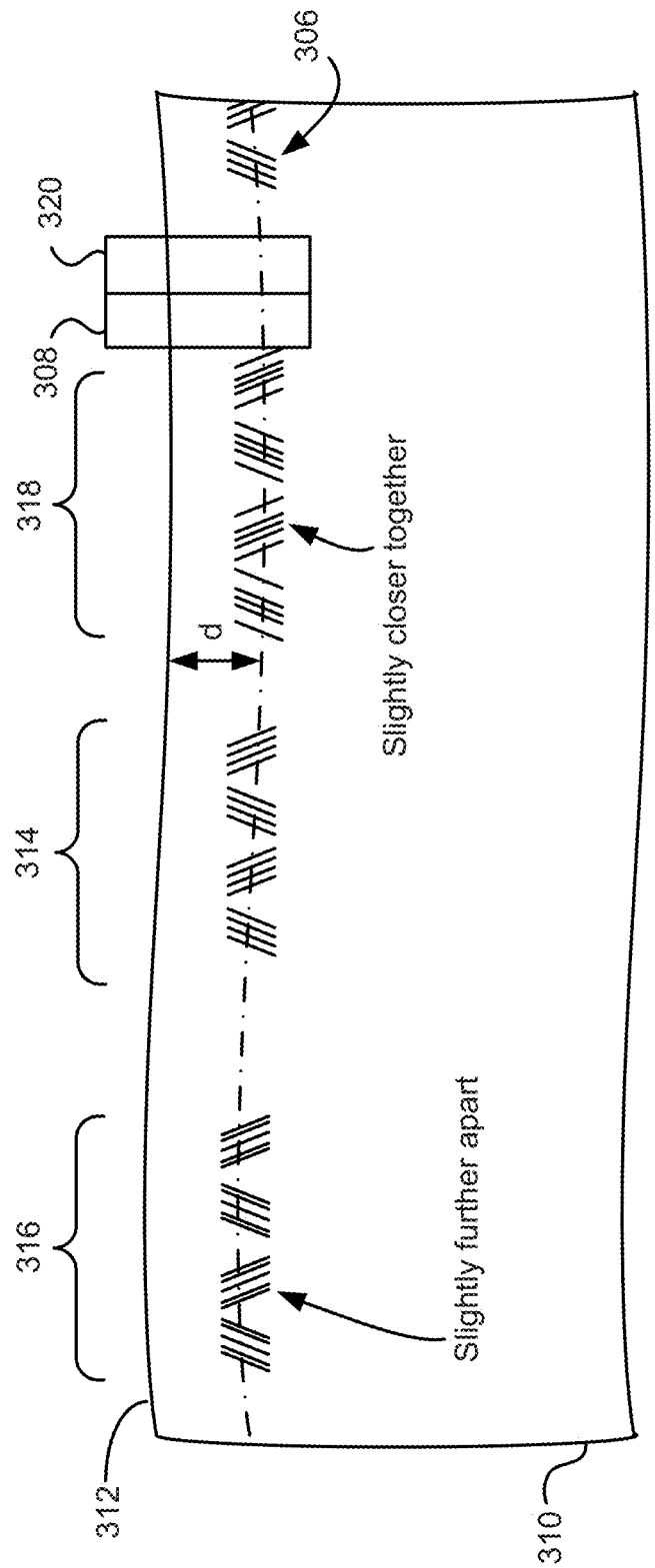
FIG. 3B illustrates a magnetic tape having servo patterns of different characteristics according to the positioning of the magnetic tape as determined by a servo channel according to the prior art.

FIG. 3B is an illustrative diagram of a magnetic tape 310 moving past a head module 320 comprising a servo reader 308 with representative servo patterns 314, 316, and 318 on the tape 310 designating servo marks. Servo patterns are typically written during manufacturing through different methods to correct for tape lateral position change and/or velocity changes.

In one embodiment, the servo marks are written with a given height, and then an optional operation is performed to trim the servo marks to a desired height by using an erase head. The height is measured in a direction perpendicular to a length of the tape and parallel to the plane of the writing surface of the tape (e.g., in the y direction of FIGS. 3A and 3C). A small height of the data bands also provides greater immunity to read/write problems typically associated with tape dimensional instability, for example lateral expansion.

Figure 3C:
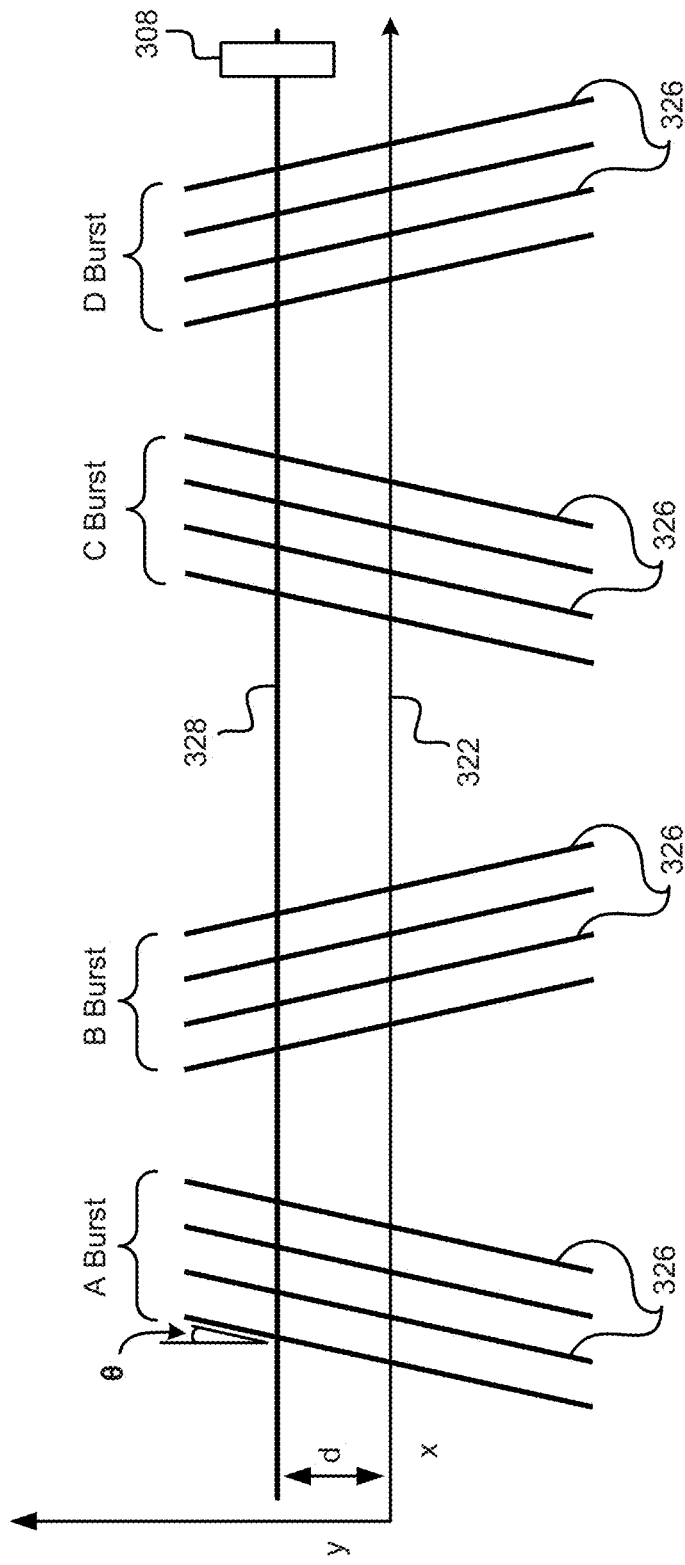
FIG. 3C illustrates servo bursts on a longitudinal tape moving past a servo reader, according to the prior art.

With reference to FIG. 3C, conventional systems include series of four servo marks forming each servo burst (A Burst, B Burst, etc.), according to one embodiment. Servo bursts and servo marks are also arranged along a servo band centerline 322 (the x direction in FIG. 3C). Indeed, servo bursts may further be designated in series of four bursts, respectively labeled as A Burst, B Burst, C Burst, and D Burst in FIG. 3C. In operation, as the servo bursts move past the servo reader 308, the servo reader 308 reads servo signals that are sampled by an analog-to-digital converter and processed by a servo channel to generate estimates of tape velocity and head module lateral position.

Figure 4:
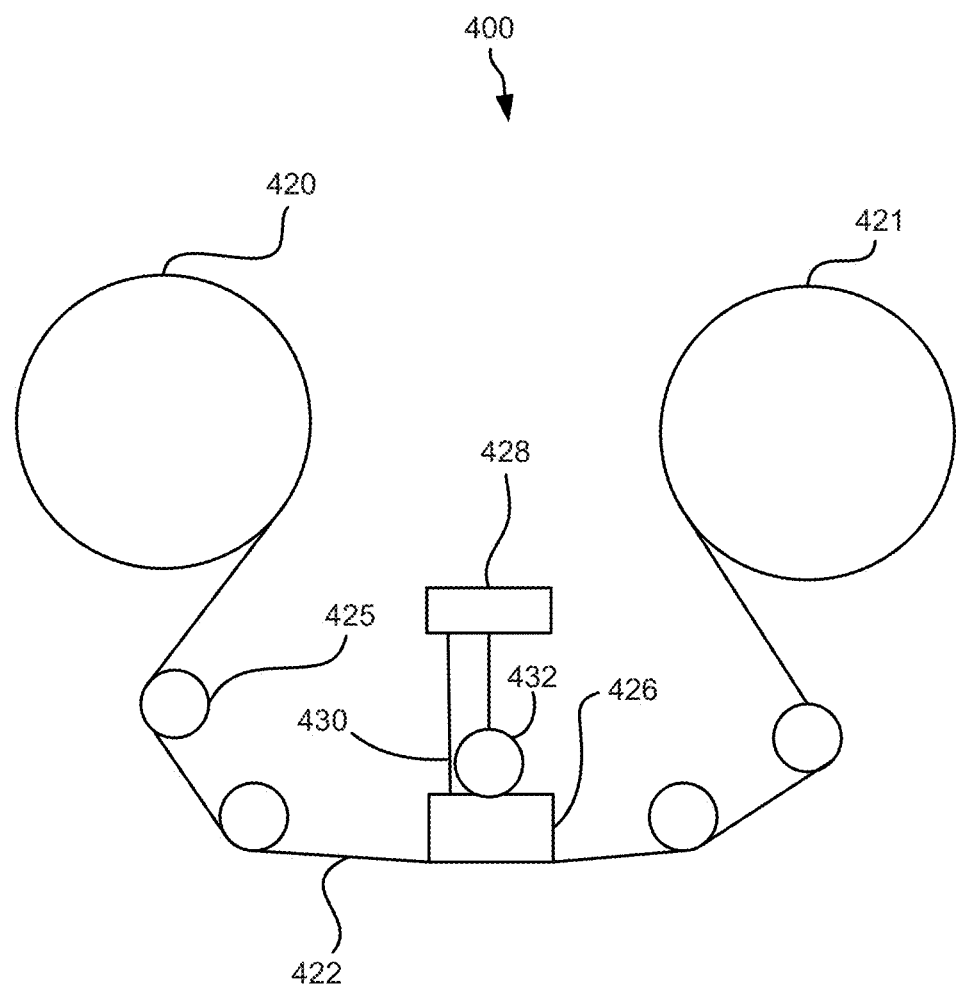
FIG. 4 is a schematic diagram of a tape drive system according to one embodiment.

FIG. 4 illustrates a simplified tape drive 400 of a tape-based data storage system, which may be employed according to various embodiments. While one specific implementation of a tape drive is shown in FIG. 4, it should be noted that the embodiments described herein may be implemented in the context of any type of tape drive system.

As shown, a tape supply cartridge 420 and a take-up reel 421 are provided to support a tape 422. One or more of the reels may form part of a removable cassette and are not necessarily part of the system 400. The tape drive, such as that illustrated in FIG. 4, may further include drive motor(s) to drive the tape supply cartridge 420 and the take-up reel 421 to move the tape 422 over a tape head 426 of any type.

Guides 425 guide the tape 422 across the tape head 426. Such tape head 426 is in turn coupled to a controller assembly 428 via a cable 430. The controller 428 typically comprises a servo channel and controls head functions, such as track following, writing, reading, etc. The cable 430 may include read/write circuits to transmit data to the head 426 to be recorded on the tape 422 and to receive data read by the head 426 from the tape 422. An actuator 432 determines position of the head 426 relative to the tape 422.

An interface may also be provided for communication between the tape drive and a host (integral or external) to send and receive the data and for controlling the operation of the tape drive and communicating the status of the tape drive to the host, all as will be understood by those of skill in the art.

Figure 5:
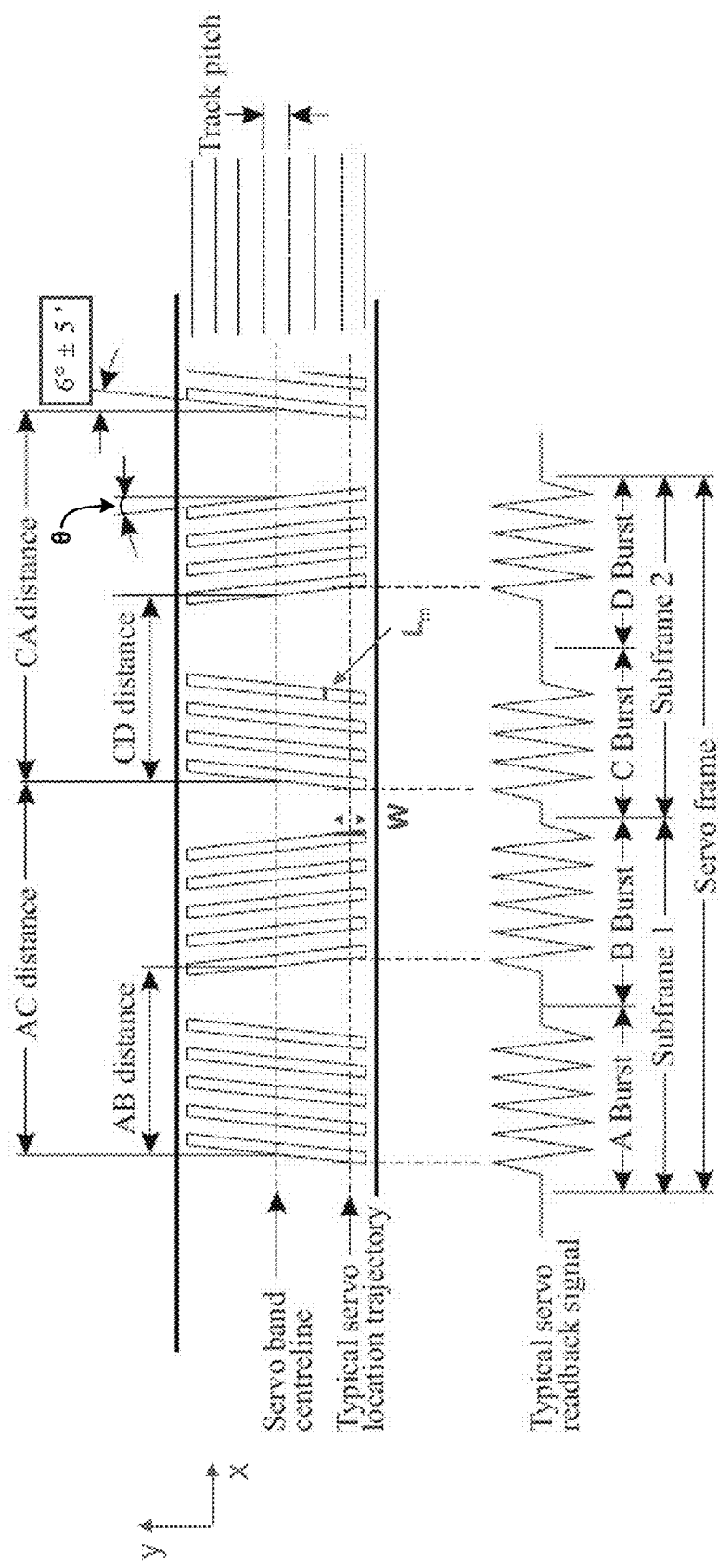
FIG. 5 illustrates a typical magnetic tape having conventional servo frame parameters according to the prior art.

Referring now to FIG. 5, which depicts conventional servo frame parameters according to the prior art, the typical servo signal depends on several servo frame parameters. In particular, a servo signal depends on the distance between servo bursts, measured along the servo track (or servo band) centerline. These include: the distance between the first servo marks of the A Burst and the B Burst respectively, known as the AB distance; the distance between the first servo marks of the C Burst and the D Burst respectively, known as the CD distance; the distance between the first servo marks of the A Burst and the C Burst respectively, known as the AC distance, and the distance between the first servo mark of the C Burst of a first servo frame and the first servo mark of the A Burst of the next servo frame, known as the CA distance.

In addition, with continuing reference to FIG. 5, the typical servo signal also depends on further servo frame parameters, including an azimuth angle $\theta$, a servo reader width W, and a servo mark width $L_m$. Typically, the azimuth angle $\theta$ is in a range from about one to about twenty degrees and the servo mark width $L_m$ is in the range of about 1.0 µm to about 2.1 µm.

Figure 6:
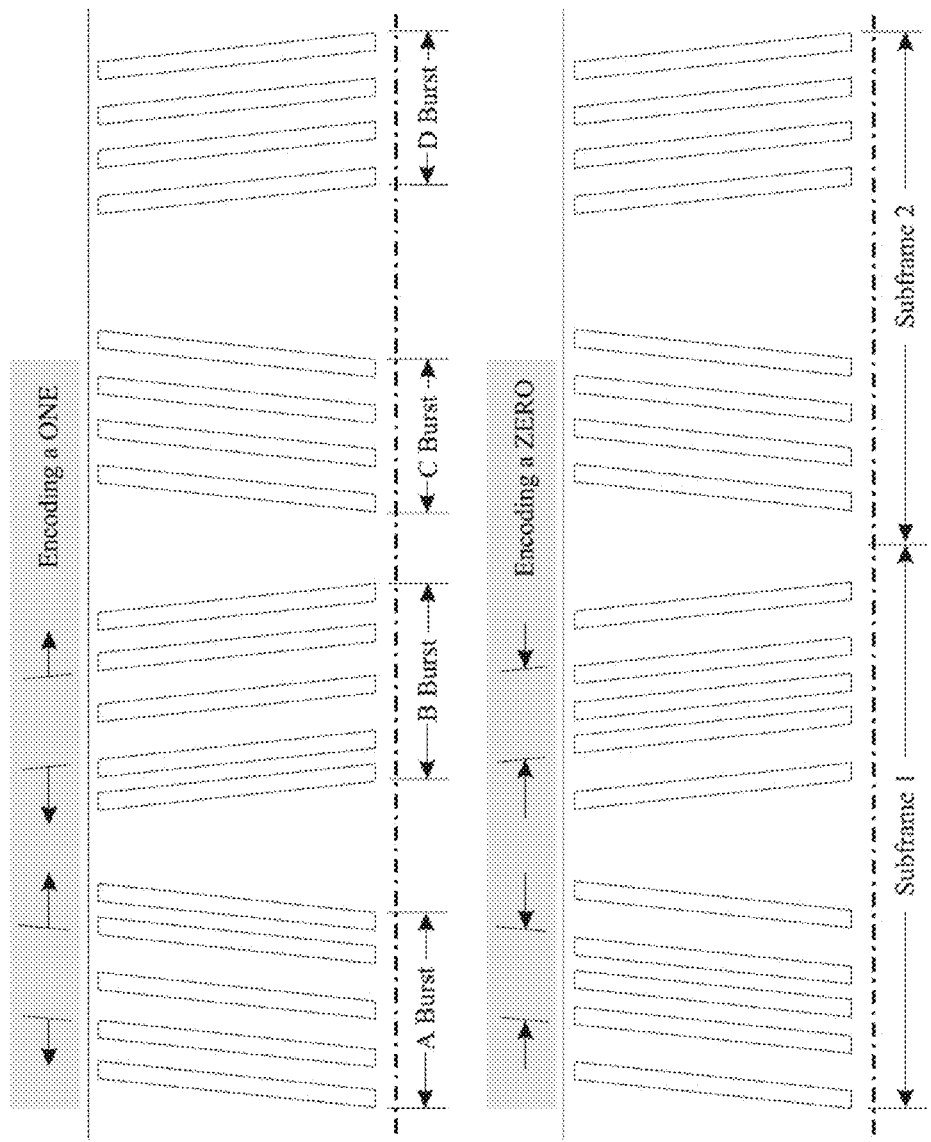
FIG. 6 shows conventional pulse-position modulation of servo marks in a typical servo pattern, according to the prior art.

Typically, longitudinal position information is encoded in the servo patterns by an encoding technique known as "pulse-position modulation," which is shown in FIG. 6 according to the prior art. According to conventional pulse-position modulation, binary data symbols "zero" and "one" may be encoded in a servo burst comprising five servo marks by modulating the position of the second and fourth servo marks.

In particular, a typical servo pattern encoding a data symbol corresponding to binary "zero" is encoded by modulating the longitudinal position of the second and fourth servo marks in a given servo burst such that the second and fourth servo marks are closer in a longitudinal direction to the third (center) servo mark than to either the first servo mark or the fifth servo mark, according to the prior art.

Similarly, a typical servo pattern encoding a data symbol corresponding to binary "one" is encoded by modulating the longitudinal position of the second and fourth servo marks in a given servo burst such that the second and fourth servo marks are further in a longitudinal direction from the third (center) servo mark than either of the first servo mark or the fifth servo mark, according to the prior art.

Figure 7:
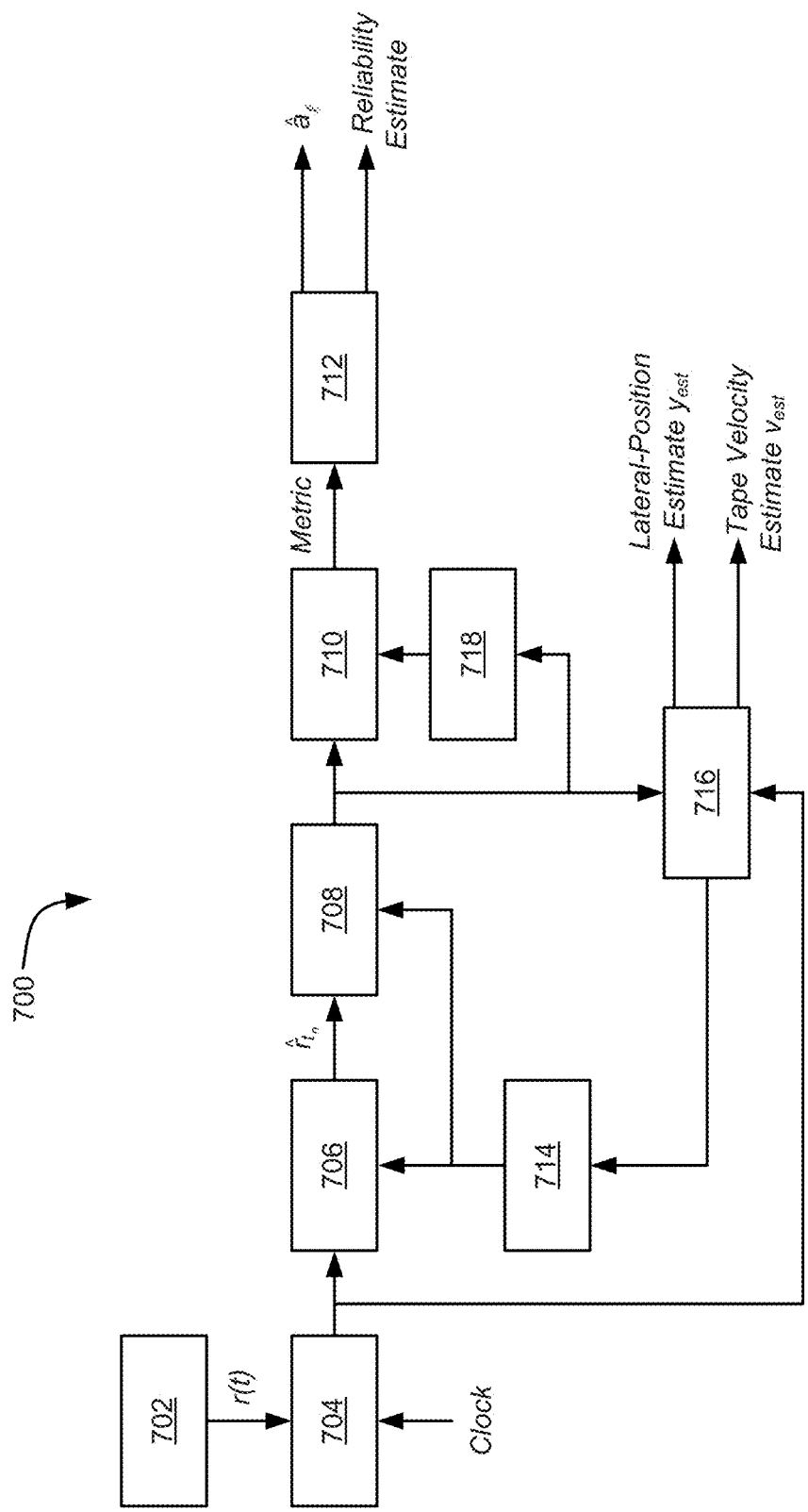
FIG. 7 is a schematic representation of a tape drive system employing a longitudinal position symbol detector, according to one embodiment.

Now referring to FIG. 7, an improved calculation of a metric for data symbol detection is shown, according to one embodiment. In one embodiment, the system 700 employs a plurality of functional modules, including a servo reader 702, an analog-to-digital (A/D) converter 704, an optional servo signal interpolator 706 which is not necessarily required nor used in some approaches, a digital correlator 708, a correlation interpolator 710, an LPOS detector 712, a timing-base reference 714, an acquisition, monitoring, and control module 716, and a timing reference 718. Moreover, the system 700 may take as input to the LPOS detector 712 a metric produced by the correlation interpolator 710, which takes as an input the output of the digital correlator 708. The digital correlator 708 computes a correlation signal between a sequence of samples of the readback servo signal and a reference waveform, or correlator impulse response, that is represented by a plurality of coefficients (not shown) which may number an amount, such as 8, 10, 16, etc., in some approaches. As output, the system 700 may produce estimates, such as a lateral-position estimate $Y_{est}$, a tape velocity estimate $v_{est}$, and a reliability estimate, and a decision on which data symbol $â_\epsilon$ is being represented in the servo bursts.

According to some embodiments, the improved metric for robust data symbol detection overcomes the limitations of the prior art. In particular, the improved metric may be computed by correlating servo bursts with a reference waveform using a digital correlator of a synchronous servo channel. Resorting to a programmable digital correlator impulse response and the filtering operation performed by the digital correlator at a sufficiently high sampling rate allows a significantly more accurate metric computation than fixed matched filtering, particularly in the presence of mismatches in the servo channel response and at high tape velocity, such as 4 m/s, 8 m/s, 12 m/s, 16 m/s, and higher, in some examples. In this manner, and as would be understood by one having ordinary skill in the art upon reading the present descriptions, aliasing effects are avoided in tape drive systems employing a LPOS detector as described herein. Therefore, the systems and methods disclosed herein have superior performance characteristics compared to those of the conventional systems.

According to one embodiment, referring to FIGS. 4 and 7, a tape drive system 700 comprises a magnetic head 426 having at least one servo sensor 702 for sensing at least one defined servo track of a magnetic tape 422. The servo sensor 702 is configured to read a plurality of servo pulses from one or more servo bursts of the servo track while the magnetic tape 422 is moving past the magnetic head 426, the one or more servo bursts representing at least an encoded data symbol. In one embodiment, the encoded data symbols may include a binary "zero" and a binary "one," but any data symbols may be encoded using pulse-position modulation as would be understood by one of skill in the art upon reading the present descriptions. The system 700 also includes an analog-to-digital converter 704 configured to provide a sequence of samples of the readback servo signal, a digital correlator 708 configured to compute a correlation signal between the sequence and a reference waveform, a timing reference module 714 configured to provide a reference timing model comprising one or more interpolation instants to the digital correlator 708, with the correlation signal being determined at each interpolation instant yielding a detection metric for one data symbol, a correlation interpolator 710 configured to interpolate the correlation signal at the interpolation instants and compute a LPOS detection metric (Metric) according to the interpolated correlation signal samples, and a LPOS detector 712 configured to decode the encoded data symbol of the one or more servo bursts using the computed LPOS detection metric and estimate a reliability of the decoded data symbol of the one or more servo bursts.

According to one embodiment, the system 700 may further comprise, as an option, a servo signal interpolator 706 configured to provide a sequence of interpolated samples from the sequence. The digital correlator 708 is then configured to compute a correlation signal between the sequence of interpolated samples and the reference waveform in this embodiment. In a further embodiment, the servo signal interpolator 706 may produce an interpolated servo signal having about a constant data sample rate per unit length of the magnetic tape 422.

In another embodiment, a signal-to-distortion ratio (SDR) of the LPOS detection metric for the magnetic tape 422 moving past the magnetic head 426 at a velocity in a range from about 1 m/s to about 12 m/s is substantially similar. This range may be greater or less than that stated, but in this range the SDR is about constant, in some approaches.

In one approach, the digital correlator 708 may rely on any number of coefficients, such as from six to eighteen coefficients, of the reference waveform to compute the correlation signal between the sequence and the reference waveform. This allows for much greater accuracy over prior art techniques.

In another approach, the sequence of interpolated samples may correspond to longitudinal inter-sample spacing in a range from about 50 nm to about 400 nm, more preferably from about 100 nm to about 300 nm on the magnetic tape 422, such as about 200 nm, in one approach.

According to one embodiment, the LPOS detector 712 may be configured to determine, using the LPOS detection metric, that a longitudinal spacing on the magnetic tape 422 between a first servo pulse and a second servo pulse is greater than a spacing between the second servo pulse and a third servo pulse and determine that a spacing between a fourth servo pulse and a fifth servo pulse is greater than a spacing between the fourth servo pulse and the third servo pulse.

In another embodiment, the LPOS detector 712 may be configured to determine, using the LPOS detection metric, that a longitudinal spacing on the magnetic tape 422 between a first servo pulse and a second servo pulse is less than a spacing between the second servo pulse and a third servo pulse and determine that a spacing between a fourth servo pulse and a fifth servo pulse is less than a spacing between the fourth servo pulse and the third servo pulse. This may be as described in relation to FIG. 6 in one approach.

With continued reference to FIG. 6, in another approach, the encoded data symbol represented by the one or more servo bursts may correspond to either a binary "zero" data symbol or a binary "one" data symbol.

In a further approach, each of the one or more servo bursts used to encode the data symbol may comprise five sequential servo pulses on the magnetic tape, wherein a second servo pulse is closer to a third servo pulse than a first servo pulse and a fourth servo pulse is closer to the third servo pulse than a fifth servo pulse in the longitudinal direction to represent the binary "zero" data symbol, and wherein the second servo pulse is closer to the first servo pulse than the third servo pulse and the fourth servo pulse is closer to the fifth servo pulse than the third servo pulse in the longitudinal direction when the servo burst represents the binary "one" data symbol.

Figure 8:
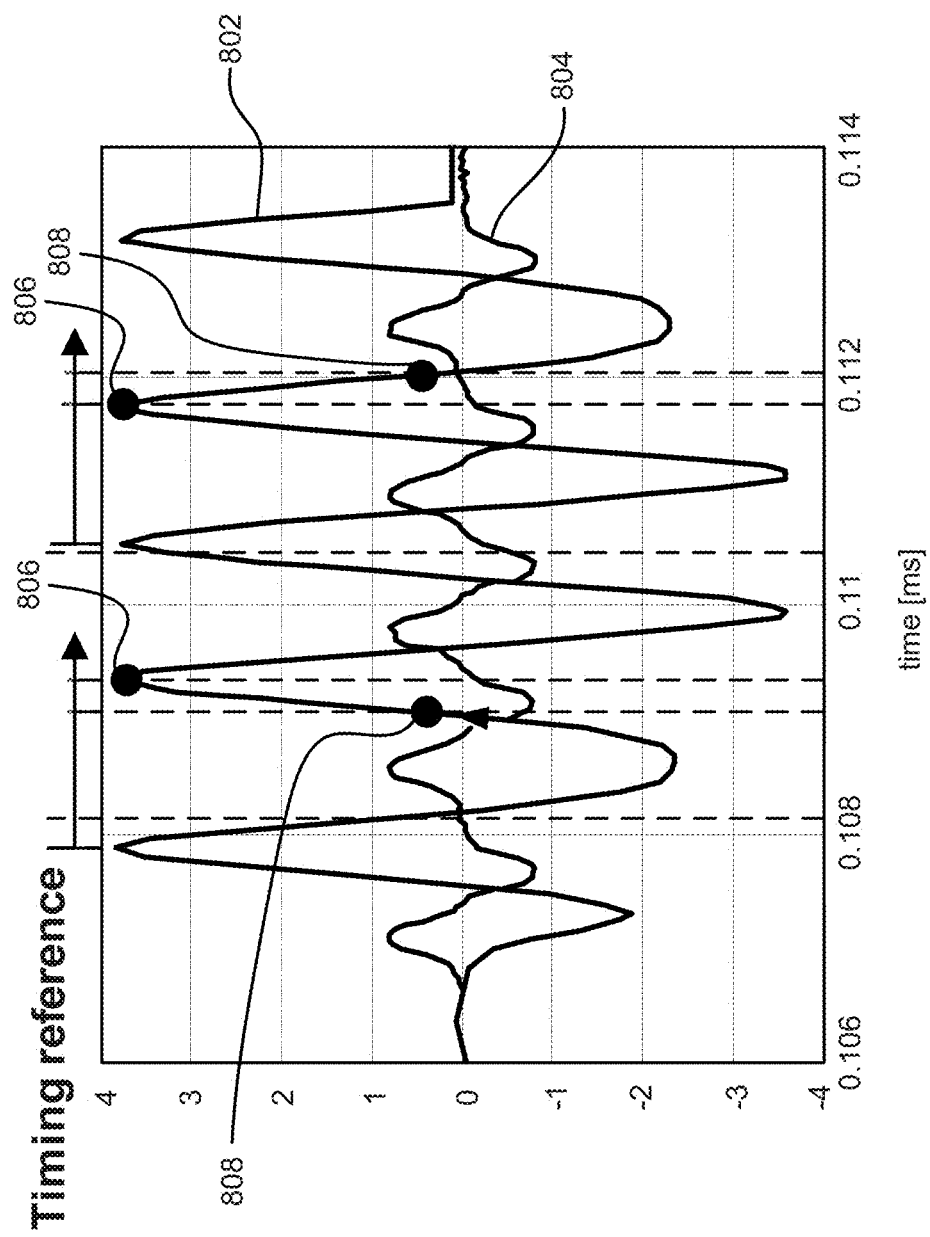
FIG. 8 is a graphical representation of a servo signal read by a servo reader and the output signal of the digital correlator in a synchronous servo channel in a tape drive system employing a longitudinal position symbol detector, according to one embodiment.

In a specific embodiment, referring now to FIG. 8, four interpolation instants 806, 808 may be calculated for each of the one or more servo bursts, the four interpolation instants comprising two instants 806 relating to a "zero" metric and two interpolation instants 808 relating to a "one" metric. In FIG. 8, calculations for only one servo burst are shown. In this embodiment, the LPOS detector may be configured to sum the interpolated correlation signal obtained at the two "zero" metric interpolation instants 806 for a first burst to calculate a first burst "zero" metric, then sum the interpolated correlation signal obtained at the two "zero" metric interpolation instants 806 for a second burst to calculate a second burst "zero" metric. The LPOS detector is also configured to perform the same calculations for the "one" metric, for example, the LPOS detector may be configured to sum the interpolated correlation signal obtained at the two "one" metric interpolation instants for the first burst to calculate a first burst "one" metric, sum the interpolated correlation signal obtained at the two "one" metric interpolation instants 808 for the second burst to calculate a second burst "one" metric. Then, the LPOS detector may be configured to sum the first burst "zero" metric and the second burst "zero" metric to calculate a "zero" LPOS metric and sum the first burst "one" metric and the second burst "one" metric to calculate a "one" LPOS metric. Then, the LPOS detector may be configured to indicate a higher of the "zero" LPOS metric and the "one" LPOS metric as the decoded data symbol, e.g., it is either "one" or "zero."

The problem of determining instants in time at which the correlator output signal is interpolated to obtain the proper metric values for LPOS detection is solved by taking, as a timing reference, the arrival time of the peak of the correlator output signal immediately preceding the correlation peak that corresponds to a modulated servo mark. The correlation values corresponding to the metric for the two hypothesis of data symbol representing binary "zero" or "one" are then obtained by interpolating of the correlation output samples at the determined time instants, according to one embodiment.

Data symbol detection based on the metric obtained from the correlator output signal presents a further advantage of a lower implementation complexity of the detection circuit, as the realization of the fixed matched filter is no longer necessary, in most approaches, and the digital correlator implementation is required in a synchronous servo channel. The matched filter is therefore being replaced by the simple logic for the interpolation of the correlator output signal.

In some embodiments, the output of the correlator is a digital signal, and the data samples arrive at equally spaced time intervals (assuming constant velocity of the magnetic tape). Therefore, to obtain a sequence of readback signal samples having a constant sample rate per unit length of the magnetic tape, the sequence of readback signal samples provided by the digital-to-analog converter is further interpolated prior to being input to the digital correlator. Accordingly, a firm interpolation is advantageous in order to compute the metric values accurately. Moreover, the correlator obtains timing information from the timing reference and therefore may obtain signals very accurately by having a further interpolation operation, in some approaches.

As an output, the correlator produces a sequence of samples that also correspond to a spacing of approximately 300 nm, in one approach. The output of the correlator may serve as an input to the correlator interpolator, which interpolates the output of the correlator and estimates the output of the correlator at intermediate points between the samples taken at 300 nm intervals. To obtain a metric for data symbol decision, the interpolated output from the correlator is accumulated into a metric until the detector receives new input from a second servo burst. After completing the accumulation of the metric values from the modulated signals within a servo frame, the detector can provide an estimate of the data symbol encoded in the servo mark pattern.

Figure 9C:
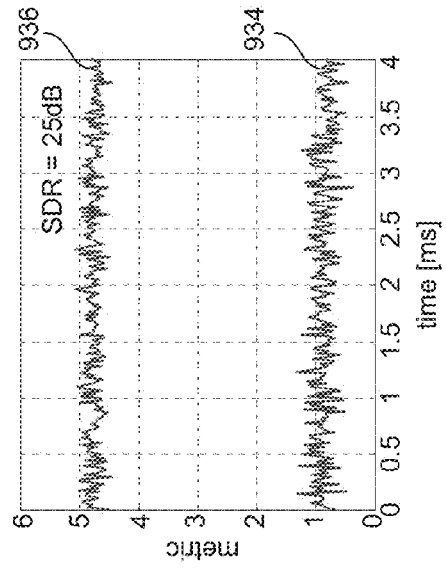
FIGS. 9C-9D are graphical representations comparing SDR as observed using a tape drive system employing a LPOS detector and a magnetic tape moving at a higher velocity of about 12 m/s versus a magnetic tape moving at a lower velocity of about 4 m/s, according to one embodiment.
Figure 9D:
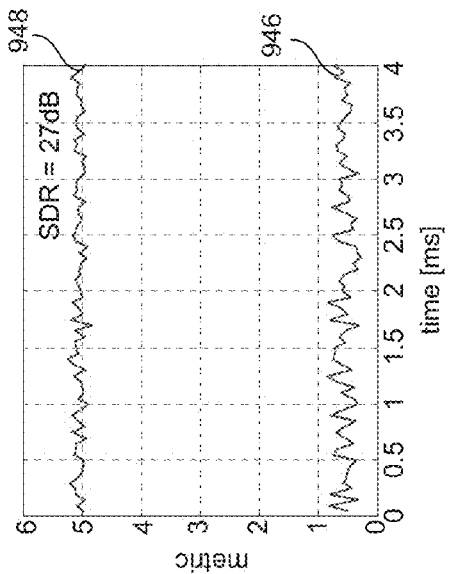
Figure 9A:
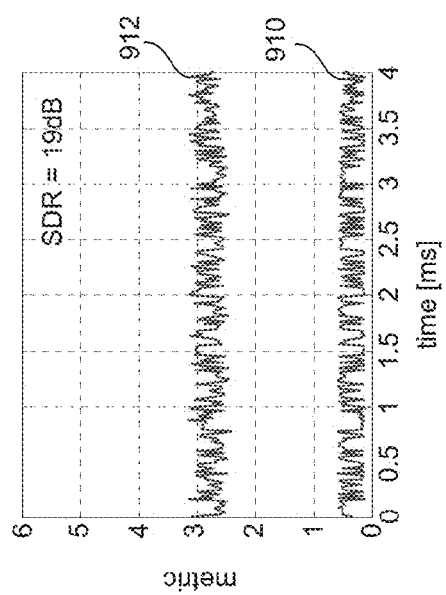
FIGS. 9A-9B are graphical representations comparing signal-to-distortion ratios (SDR) as observed using a tape drive system employing a longitudinal position (LPOS) detector and a magnetic tape moving at a high velocity of about 12 m/s versus a magnetic tape moving at a lower velocity of about 4 m/s, according to the prior art.
Figure 9B:
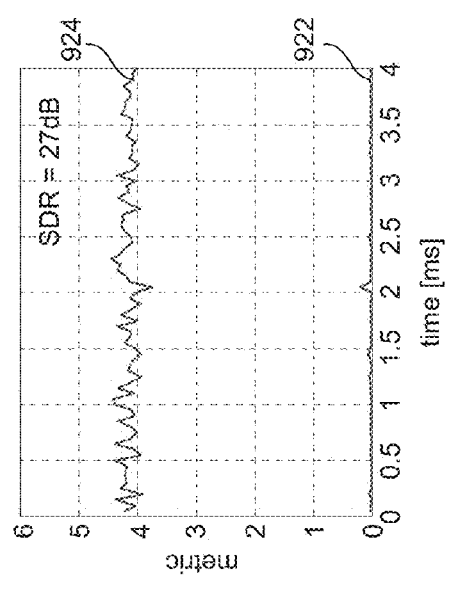

FIGS. 9A-9B are graphical representations comparing signal-to-distortion ratios (SIR) as observed using a tape drive system employing a LPOS detector and a magnetic tape moving at a high velocity of about 12 m/s versus a magnetic tape moving at a lower velocity of about 4 m/s, using conventional systems. As is clear from FIGS. 9A and 9B, conventional metrics, such as matched-filter metric approaches using a finite-impulse filter with a small number of coefficients, experience degradation in performance, particularly in the ability to distinguish correct from incorrect servo pattern hypotheses, with increasing tape velocity. FIG. 9B shows the performance of a system employing a conventional metric and a tape moving at a velocity of approximately 4 m/s, resulting in a SDR of approximately 27 dB, which allows to reliably decide between the incorrect hypotheses 924 and the correct hypotheses 922. By comparison, when the tape velocity is increased to about 12 m/s, as shown in FIG. 9A, the decisions between incorrect hypotheses 912 and correct hypotheses 910 are significantly less reliable, as the SDR is reduced to about 19 dB, unfavorably.

In comparison, FIGS. 9C-9D are graphical representations showing SDR as observed using a tape drive system employing an improved LPOS detector and metric with a magnetic tape moving at a high velocity of about 12 m/s versus a magnetic tape moving at a low velocity of about 4 m/s, according to one embodiment. As is clear from FIGS. 9C and 9D, improved LPOS detectors and metrics such as those disclosed in the present descriptions experience comparatively less degradation in performance relative to conventional systems and approaches. In particular, FIG. 9D shows the performance of a system employing a conventional metric and a tape moving at a velocity of approximately 4 m/s, resulting in a SDR of approximately 27 dB, thus allowing reliable decisions between the incorrect hypotheses 946 and the correct hypotheses 948. By comparison, when the tape velocity is increased to about 12 m/s, as shown in FIG. 9C, the distinction between incorrect hypothesis 934 and correct hypothesis 936 is only slightly reduced, as the SDR is in this case about 25 dB, indicating a favorable improvement in SDR of about 6 dB over conventional approaches, according to one embodiment.

Figure 10A:
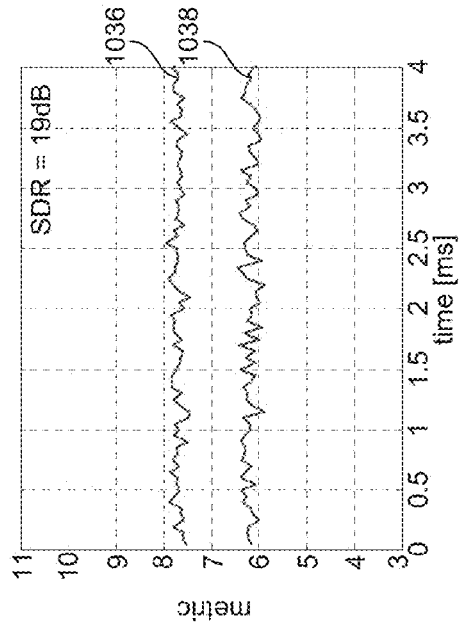
FIG. 10A is a graph comparing expected servo signal pulses and observed servo signal pulses from a tape drive system employing a LPOS detector as a function of servo mark width, according to one embodiment.

FIG. 10A is a graph comparing expected and observed servo signals from a tape drive system employing a LPOS detector as a function of servo mark width, according to one embodiment. In one embodiment, the correlator of the LPOS position detection system may employ a kernel with a plurality of coefficients, for example 12 coefficients are utilized by the exemplary embodiment represented in FIG. 7 and by the exemplary pulse comparison shown in FIG. 10A. However, any number of coefficients may be used, as would be understood by one of skill in the art upon reading the present descriptions. The coefficients are characterized as corresponding to data samples taken from the longitudinal tape and separated by a spacing of about 300 nm. The correlator operates to calculate a correlation between the expected servo signal pulse response, for example default response 1018 in FIG. 10A, and/or identified response 1014 of FIG. 10A, and the observed servo signal pattern, for example channel response 1016.

Figure 10C:
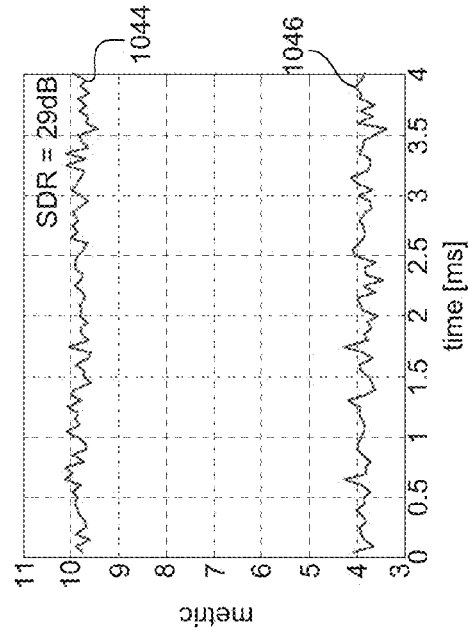
FIG. 10C is a graph comparing SDR ratios as observed using a tape drive system employing a LPOS detector and a detection metric with default parameters, according to one embodiment.
Figure 10B:
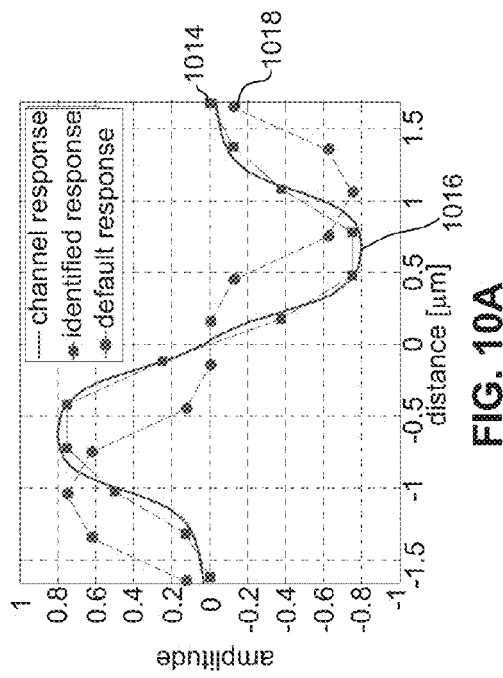
FIG. 10B is a graph comparing SDR as observed using a tape drive system employing a LPOS detector and a detection metric, according to the prior art.

FIG. 10B is a graph comparing SDRs as observed using a tape drive system employing a LPOS detector and a detection metric, using conventional methods. As shown in FIG. 10B, the conventional LPOS detection metric provides a very low capacity to distinguish between the correct servo pattern hypotheses 1024 and the incorrect servo pattern hypotheses 1022. Indeed, the SDR is of about 4 dB, determining a high likelihood that an incorrect decoding decision will occur, especially when the tape velocity increases.

FIG. 10C is a graph comparing SDRs as observed using a tape drive system employing a LPOS detector and an improved detection metric with default reference pulse response used by the digital correlator, according to one embodiment. As compared to the conventional metric, the improved metric using default response provides improved distinction between incorrect hypotheses 1038 and correct hypothesis 1036, due to a SDR of about 19 dB, providing correspondingly more robust performance from the LPOS position detection metric and more reliable decoding of data symbols on a magnetic tape.

Figure 10D:
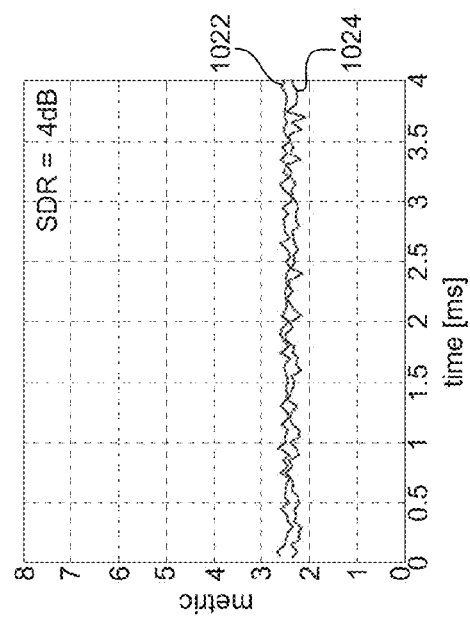
FIG. 10D is a graph comparing SDR ratios as observed using a tape drive system employing a LPOS detector and a detection metric with identified parameters, according to one embodiment.

FIG. 10D is a graph comparing SDR ratios as observed using a tape drive system employing a LPOS detector and a detection metric obtained by a digital correlator having a reference waveform characterized by identified servo channel parameters, according to one embodiment. As compared to the conventional metric and the improved metric obtained by using default servo channel parameters, the improved metric obtained by using identified reference pulse response in the digital correlator provides improved distinction between incorrect hypothesis 1046 and correct hypothesis 1044, providing correspondingly more robust performance from the LPOS detection metric and more reliable decoding of data symbols in a magnetic tape.

Figure 11:
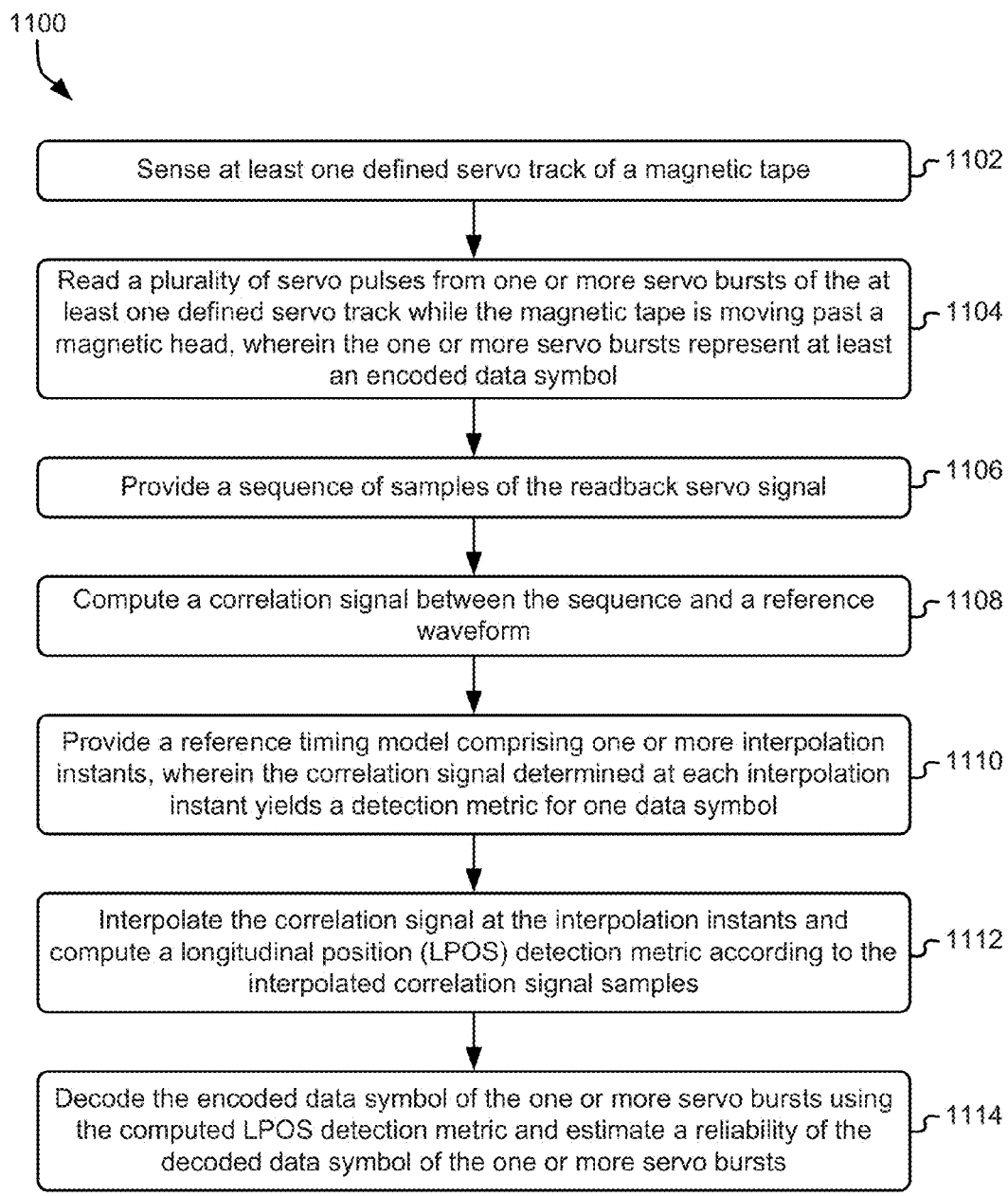
FIG. 11 is a flowchart of a method, according to one embodiment.

FIG. 11 illustrates a method 1100 according to one embodiment. As an option, the present method 1100 may be implemented in the context of the functionality and architecture of FIGS. 1-10D. However, method 1100 may be carried out in any desired environment. It should be noted that the aforementioned definitions may apply during the present description, and that method 1100 may include more or less operations than those described herein, according to various embodiments.

In one embodiment, the method 1100 initiates at operation 1102, where at least one defined servo track of a magnetic tape is sensed, through any method and/or system as known in the art, such as a servo reader, servo sensor, etc.

In operation 1104, a plurality of servo pulses are read from one or more servo bursts of the servo track while the magnetic tape is moving past the magnetic head. The one or more servo bursts represent at least an encoded data symbol. For example, one or more of the servo bursts forming each servo frame may represent an encoded data symbol. In one embodiment, these data symbols preferably may represent binary "one" and binary "zero" in a computing environment, in one approach.

In operation 1106, a sequence of samples of the readback servo signal is provided. Any method and/or system may be used to provide the sequence as would be known by one of skill in the art, such as a digital-to-analog (D/A) converter, according to one embodiment.

In operation 1108, a correlation signal between the sequence and a reference waveform is computed using any method and/or system as would be known by one of skill in the art, such as a digital correlator in one approach.

In operation 1110, a reference timing model is provided comprising one or more interpolation instants. The correlation signal determined at each interpolation instant yields a detection metric for one data symbol, according to one approach. The reference timing model may be provided to any system for usage thereof, as would be understood by one of skill in the art, such as to a digital correlator, in one embodiment.

In operation 1112, the correlation signal is interpolated at the interpolation instants and a longitudinal position (LPOS) detection metric is computed according to the interpolated correlation signal samples. Any method and/or system may be used to interpolate the correlation signal and/or compute the LPOS detection metric as would be understood by one of skill in the art upon reading the present descriptions, such as a correlation interpolator in one approach.

In operation 1114, the encoded data symbol of the one or more servo bursts is decoded using the computed LPOS detection metric and a reliability of the decoded data symbol of the one or more servo bursts is estimated. The decoding and the estimating may be performed according to any method and/or system as would be understood by one of skill in the art upon reading the present descriptions, such as a LPOS detector in one approach.

In this way, a correlation of detected and interpolated points of a pulse-position modulated servo signal pulse with a reference waveform may be integrated at a desired location and with a desired pattern, such as that of an encoded binary "zero" and an encoded binary "one," according to one approach.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive system, comprising:
   a magnetic head having at least one servo sensor for sensing at least one defined servo track of a magnetic tape, wherein the servo sensor is configured to read a plurality of servo pulses from one or more servo bursts of the servo track while the magnetic tape is moving past the magnetic head, wherein the one or more servo bursts represent at least an encoded data symbol;
   an analog-to-digital converter configured to provide a sequence of samples of the readback servo signal;
   a digital correlator configured to compute a correlation signal between the sequence and a reference waveform;
   a timing reference module configured to provide a reference timing model comprising one or more interpolation instants to the digital correlator, wherein the correlation signal determined at each interpolation instant yields a detection metric for one data symbol;
   a correlation interpolator configured to interpolate the correlation signal at the interpolation instants and compute a longitudinal position (LPOS) detection metric according to the interpolated correlation signal samples; and
   an LPOS detector configured to decode the encoded data symbol of the one or more servo bursts using the computed LPOS detection metric and estimate a reliability of the decoded data symbol of the one or more servo bursts.

2. The tape drive system as recited in claim 1, further comprising a servo signal interpolator configured to provide a sequence of interpolated samples from the sequence, wherein the digital correlator is configured to compute a correlation signal between the sequence of interpolated samples and the reference waveform.

3. The tape drive system as recited in claim 2, wherein the servo signal interpolator produces an interpolated servo signal having about a constant data sample rate per unit length of the magnetic tape.

4. The tape drive system as recited in claim 1, wherein a signal-to-distortion ratio of the LPOS detection metric for the magnetic tape moving past the magnetic head at a velocity in a range from about 1 m/s to about 12 m/s is substantially similar.

5. The tape drive system as recited in claim 1, wherein the digital correlator relies on a plurality of coefficients of the reference waveform to compute the correlation signal between the sequence and the reference waveform, the plurality of coefficients numbering from six to eighteen.

6. The tape drive system as recited in claim 1, wherein the sequence of interpolated samples corresponds to longitudinal inter-sample spacing in a range from about 100 nm to about 300 nm on the magnetic tape.

7. The tape drive system as recited in claim 1, wherein the LPOS detector is configured to determine, using the LPOS detection metric, that a longitudinal spacing on the magnetic tape between a first servo pulse and a second servo pulse is greater than a spacing between the second servo pulse and a third servo pulse and determine that a spacing between a fourth servo pulse and a fifth servo pulse is greater than a spacing between the fourth servo pulse and the third servo pulse.

8. The tape drive system as recited in claim 1, wherein the LPOS detector is configured to determine, using the LPOS detection metric, that a longitudinal spacing on the magnetic tape between a first servo pulse and a second servo pulse is less than a spacing between the second servo pulse and a third servo pulse and determine that a spacing between a fourth servo pulse and a fifth servo pulse is less than a spacing between the fourth servo pulse and the third servo pulse.

9. The tape drive system as recited in claim 1, wherein the encoded data symbol represented by the one or more servo bursts corresponds to either a binary "zero" data symbol or a binary "one" data symbol.

10. The tape drive system as recited in claim 9, wherein each of the one or more servo bursts used to encode the data symbol comprises five sequential servo pulses on the magnetic tape, wherein a second servo pulse is closer to a third servo pulse than a first servo pulse and a fourth servo pulse is closer to the third servo pulse than a fifth servo pulse in the longitudinal direction to represent the binary "zero" data symbol, and wherein the second servo pulse is closer to the first servo pulse than the third servo pulse and the fourth servo pulse is closer to the fifth servo pulse than the third servo pulse in the longitudinal direction when the servo burst represents the binary "one" data symbol.

11. The tape drive system as recited in claim 1,
   wherein four interpolation instants are calculated for each of the one or more servo bursts, the four interpolation instants comprising two instants relating to a "zero" metric and two interpolation instants relating to a "one" metric, and
   wherein the LPOS detector is configured to:
      sum the interpolated correlation signal obtained at the two "zero" metric interpolation instants for a first burst to calculate a first burst "zero" metric;

sum the interpolated correlation signal obtained at the two "zero" metric interpolation instants for a second burst to calculate a second burst "zero" metric;

sum the interpolated correlation signal obtained at the two "one" metric interpolation instants for the first burst to calculate a first burst "one" metric;

sum the interpolated correlation signal obtained at the two "one" metric interpolation instants for the second burst to calculate a second burst "one" metric;

sum the first burst "zero" metric and the second burst "zero" metric to calculate a "zero" LPOS metric;

sum the first burst "one" metric and the second burst "one" metric to calculate a "one" LPOS metric; and indicate a higher of the "zero" LPOS metric and the "one" LPOS metric as the decoded data symbol.

12. A computer program product comprising a computer readable storage medium having computer readable program code embodied therewith, the computer readable program code comprising:

computer readable program code configured to receive a plurality of servo pulses read from at least one defined servo track of a magnetic tape while the magnetic tape is moving past a magnetic head, wherein the plurality of servo pulses are from one or more servo bursts, the one or more servo bursts representing at least an encoded data symbol;

computer readable program code configured to provide a sequence of samples of the readback servo signal;

computer readable program code configured to compute a correlation signal between the sequence and a reference waveform;

computer readable program code configured to provide a reference timing model comprising one or more interpolation instants, wherein the correlation signal determined at each interpolation instant yields a detection metric for one data symbol;

computer readable program code configured to interpolate the correlation signal at the interpolation instants and compute a longitudinal position (LPOS) detection metric according to the interpolated correlation signal samples; and computer readable program code configured to decode the encoded data symbol of the one or more servo bursts using the computed LPOS detection metric and estimate a reliability of the decoded data symbol of the one or more servo bursts.

13. The computer program product as recited in claim 12, further comprising:

computer readable program code configured to provide a sequence of interpolated samples from the sequence; and wherein the computer readable program code configured to compute the correlation signal between the sequence and the reference waveform computes the correlation signal between the sequence of interpolated samples and the reference waveform.

14. The computer program product as recited in claim 12, wherein a signal-to-distortion ratio of the LPOS detection metric for the magnetic tape moving past the magnetic head at a velocity in a range from about 1 m/s to about 12 m/s is substantially similar.

15. The computer program product as recited in claim 12, wherein the interpolated servo signal has about a constant data sample rate per unit length of the magnetic tape.

16. The computer program product as recited in claim 12, wherein a plurality of coefficients of the reference waveform are used to compute the correlation signal between the sequence and the reference waveform, the plurality of coefficients numbering from six to eighteen.

17. The computer program product as recited in claim 12, wherein the sequence of interpolated samples corresponds to longitudinal inter-sample spacing in a range from about 100 nm to about 300 nm on the magnetic tape.

18. The computer program product as recited in claim 12, wherein the encoded data symbol represented by the one or more servo bursts corresponds to either a binary "zero" data symbol or a binary "one" data symbol.

19. The computer program product as recited in claim 18, wherein each of the one or more servo bursts used to encode the data symbol comprises five sequential servo pulses on the magnetic tape, wherein a second servo pulse is closer to a third servo pulse than a first servo pulse and a fourth servo pulse is closer to the third servo pulse than a fifth servo pulse in the longitudinal direction to represent the binary "zero" data symbol, and wherein the second servo pulse is closer to the first servo pulse than the third servo pulse and the fourth servo pulse is closer to the fifth servo pulse than the third servo pulse in the longitudinal direction when the servo burst represents the binary "one" data symbol.

20. A method, comprising:

reading a plurality of servo pulses from one or more servo bursts of a servo track while a magnetic tape is moving past a magnetic head, wherein the one or more servo bursts represent at least an encoded data symbol;

providing a sequence of samples of the readback servo signal;

computing a correlation signal between the sequence and a reference waveform;

providing a reference timing model comprising one or more interpolation instants, wherein the correlation signal determined at each interpolation instant yields a detection metric for one data symbol;

interpolating the correlation signal at the interpolation instants and computing a longitudinal position (LPOS) detection metric according to the interpolated correlation signal samples;

decoding the encoded data symbol of the one or more servo bursts using the computed LPOS detection metric; and estimating a reliability of the decoded data symbol of the one or more servo bursts, wherein the interpolated servo signal has about a constant data sample rate per unit length of the magnetic tape, wherein the encoded data symbol represented by the one or more servo bursts corresponds to either a binary "zero" data symbol or a binary "one" data symbol, and wherein from six to eighteen coefficients of the reference waveform are used to compute the correlation signal between the sequence and the reference waveform.

* * * * *